United States Patent
Sakano et al.

(10) Patent No.: US 10,122,296 B2
(45) Date of Patent: Nov. 6, 2018

(54) POWER CONVERTER, DIAGNOSTIC SYSTEM OF POWER CONVERTER, AND POWER CONVERTER DIAGNOSTIC METHOD USING CURRENT CHANGE

(71) Applicant: HITACHI, LTD., Chiyoda-ku, Tokyo (JP)

(72) Inventors: Junichi Sakano, Tokyo (JP); Kimihisa Furukawa, Tokyo (JP); Takashi Ogawa, Tokyo (JP); Hisashi Endou, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/123,212

(22) PCT Filed: Jun. 22, 2015

(86) PCT No.: PCT/JP2015/067898
§ 371 (c)(1),
(2) Date: Sep. 1, 2016

(87) PCT Pub. No.: WO2016/207954
PCT Pub. Date: Dec. 29, 2016

(65) Prior Publication Data
US 2018/0123477 A1    May 3, 2018

(51) Int. Cl.
*H02M 7/53*    (2006.01)
*H02M 7/539*    (2006.01)
(Continued)

(52) U.S. Cl.
CPC ............. *H02M 7/539* (2013.01); *H02M 1/32* (2013.01); *H02M 7/48* (2013.01); *H02M 7/53* (2013.01);
(Continued)

(58) Field of Classification Search
CPC ...................................................... H02M 7/53
See application file for complete search history.

(56) References Cited

U.S. PATENT DOCUMENTS 6,304,472 B1    10/2001    Nagasu et al.
9,240,736 B2    1/2016    Shimomugi et al.
(Continued)

FOREIGN PATENT DOCUMENTS

CN    1274192 A    11/2000
CN    103477545 A    12/2013
(Continued)

OTHER PUBLICATIONS

First Office Action dated Jun. 4, 2018 for Chinese Application No. 201580011039.6.

*Primary Examiner* — Jue Zhang
*Assistant Examiner* — Trinh Q Dang
(74) *Attorney, Agent, or Firm* — Miles & Stockbridge P.C.

(57) ABSTRACT

A diagnostic system for a power converter which includes a semiconductor device, and which performs a switching operation between conduction and interruption of the principal current flowing through a main circuit. The diagnostic system includes a current change amount calculation circuit for obtaining numeric data which reflects a current change amount of the principal current per unit time, a determination circuit for determining a state of the power converter by comparing the numeric data with a reference value, and an output circuit for outputting a determination result of the determination circuit.

13 Claims, 10 Drawing Sheets

(51) Int. Cl.
*H02M 7/48* (2007.01)
*H02M 1/32* (2007.01)
*H02M 1/00* (2006.01)

(52) U.S. Cl.
CPC ............ *H02M 2001/0009* (2013.01); *H02M 2001/0012* (2013.01); *H02M 2001/327* (2013.01)

(56) References Cited

U.S. PATENT DOCUMENTS

2016/0126840 A1* 5/2016 Kelly ................... H02M 1/08
 323/271
2016/0233768 A1* 8/2016 de Cremoux ......... H02M 3/157

FOREIGN PATENT DOCUMENTS

| | | |
|---|---|---|
| JP | 7-170724 A | 7/1995 |
| JP | 2000-324846 A | 11/2000 |
| TW | 201509094 A | 3/2015 |

* cited by examiner (a)

(b)

| REGION | DEFINITION |
|---|---|
| A | RANGE OF TEMPERATURE CHANGE AMOUNT IN STANDARD OPERATION STATE |
| B | RANGE OF TEMPERATURE CHANGE AMOUNT IN LIFE EXTENDING OPERATION STATE |
| C | RANGE OF TEMPERATURE CHANGE AMOUNT FOR WARNING DISPLAY IN LIFE EXTENDING OPERATION STATE |
| D | RANGE OF TEMPERATURE CHANGE AMOUNT FOR WARNING DISPLAY IN STANDARD OPERATION STATE |

FIG. 9
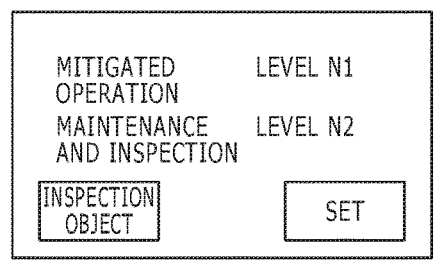
(a)
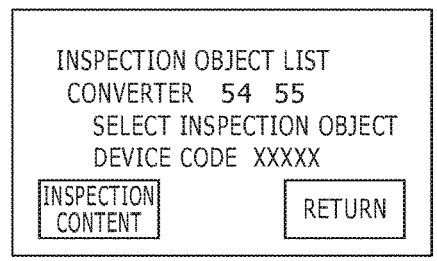
(b)
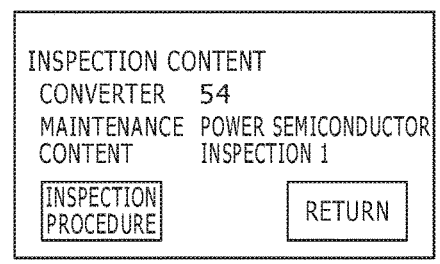
(c)
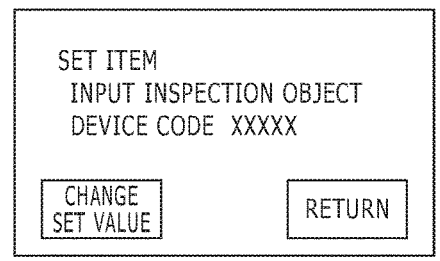
(d)

FIG.10

MEASUREMENT CONDITION
IN INTERRUPTION

| PERIOD Z1 | START: | END: |
| PERIOD Z2 | START: | END: |

(a)

DETERMINATION CONDITION
IN INTERRUPTION (PERIOD Z1)

| REGION | MINIMUM TEMPERATURE | MAXIMUM TEMPERATURE | MODE |
|---|---|---|---|
| A | 30 | 50 | NORMAL |
| B | 50 | 100 | MITIGATED 1 |

(b)

POWER CONVERTER, DIAGNOSTIC SYSTEM OF POWER CONVERTER, AND POWER CONVERTER DIAGNOSTIC METHOD USING CURRENT CHANGE

TECHNICAL FIELD

The present invention relates to a power converter. More particularly, the present invention relates to maintenance or diagnostic technique of the power converter constituted by a power semiconductor switching element, which is used for controlling the electric motor mounted on railway vehicles and large-sized industrial apparatuses, and for large-capacity frequency converters of electric power systems.

BACKGROUND ART

The power converter employed for controlling the electric motor of the railway vehicle and the large-sized industrial apparatus, and for the large-capacity frequency converter of the electric power system is configured to execute large-current power control at high voltage. Upon occurrence of failure in operation, the aforementioned device may cause damage to the system, and unplanned system down, resulting in possible serious economic loss. In order to prevent the aforementioned circumstances, it is necessary to prevent destruction owing to the function stop, notify relevant parties of necessity of the maintenance work, and execute the life extending control of the power converter for suppressing deterioration by detecting deterioration and abnormality before destruction occurs.

For example, there is the method of detecting over-temperature abnormality of the power converter detected by the temperature sensor disposed near the power semiconductor for conduction-interruption of the current. However, it is difficult for such power converter to detect temperature rise of the semiconductor chip owing to the thermal resistance increase in the power semiconductor. Accordingly, direct detection of the temperature abnormality of the semiconductor chip by itself is demanded as disclosed in Japanese Unexamined Patent Application Publication No. Hei 7-170724 (Patent Literature 1). In the aforementioned example, the control command signal and the delay time elapsing until interruption of the power semiconductor are detected so that the temperature rise in the power bipolar transistor is detected.

Japanese Unexamined Patent Application Publication No. 2000-324846 (Patent Literature 2) discloses the method of detecting current abnormality of the element. The power converter including an inductance connected to a main terminal of the switching element, and an integrator for integration of the voltage generated at both ends of the inductance is used so that the output current of the switching element is obtained. If the obtained output current value exceeds the specified value, the switching element is interrupted for preventing destruction of the element.

CITATION LIST

Patent Literature

Patent Literature 1: Japanese Patent Application No. Hei 7-170724
Patent Literature 2: Japanese Patent Application No. 2000-324846

SUMMARY OF INVENTION

Technical Problem

In the case of Japanese Unexamined Patent Application Publication No. Hei 7-170724, the circuit for determining the output voltage of the power semiconductor is required for detection of the abnormal temperature rise of the power semiconductor. However, it is difficult to apply the technique due to the following reasons. As the large-capacity power converter is configured to control the high voltage, it is difficult to dispose the large-sized voltage divider circuit. In the case of the three-phase AC control, provision of at least six elements of the power semiconductors is necessary, demanding a large number of the voltage divider circuits for evaluating those voltages. Since the analog value upon high-speed switching of the large current is handled, some kind of countermeasure for high noise is needed.

In the case of Japanese Unexamined Patent Application Publication No. 2000-324846, it is possible to detect the overcurrent abnormality by obtaining the current value so as to prevent destruction by interrupting the power semiconductor. However, it is difficult to apply the technique to preliminarily detect deterioration or abnormality of the element and the system before current abnormality is caused by development of the deterioration or abnormality so as to conduct maintenance at the earlier stage for preventing the unplanned system down, and to the life extending control for lessening the stress exerted to the element caused by prolonging the operation period.

The present invention provides the method of detecting abnormality and deterioration of the power semiconductor and the relevant power converter with high accuracy by the simple structure, preventing failure such as breakdown with high accuracy, and further allowing the prolonged service life.

Solution to Problem

The present invention provides the diagnostic system for a power converter which includes a semiconductor device, and performs a switching operation between conduction and interruption of a principal current flowing through a main circuit. The system includes a current change amount calculation circuit for obtaining numeric data which reflects a current change amount of the principal current per unit time, a determination circuit for determining a state of the power converter by comparing the numeric data with a reference value, and an output circuit for outputting a determination result of the determination circuit.

In a preferred mode, it is possible to set at least one of a time period taken for obtaining the numeric data and the reference value. There is a timing at which fluctuation of the principal current is observed during the switching operation as the typical period for acquiring numeric data, for example, the timing at which the transient current flows during interruption of switching.

In another preferred mode, during a time period for obtaining the numeric data, the current change amount calculation circuit integrates the current change amount per unit time to obtain the numeric data. That is, the current change amount within the predetermined time width is calculated.

In the specific example of the system application, the current change amount calculation circuit is connected with the power converter by conducting at least one of integral formation, wired connection, wireless connection, and connection separable with a terminal. The determination circuit is connected with the current change amount calculation circuit by conducting at least one of integral formation, wired connection, wireless connection, and connection separable with the terminal. The output circuit is connected with the determination circuit by conducting at least one of integral formation, wired connection, wireless connection, and connection separable with the terminal. This example provides high freedom degree in the structural aspect, which allows the monitor system to remotely diagnose the power converter mounted on a train.

In another aspect of the present invention, there is provided a diagnostic method of a power converter which includes a semiconductor switching element for a switching operation between conduction and interruption of a principal current. The method includes a first step of detecting a current change amount of the principal current per unit time, a second step of integrating the current change amount through a digital circuit or an analog circuit for a predetermined time period, and a third step of determining a state of the power converter based on a result of the integration.

Specifically, the instantaneous current change rate is integrated to acquire the current change amount per detection time for a predetermined period of time as the current rate amount per unit time to be detected.

Based on the determination results acquired above, the state of the power converter may be diagnosed. Based on the diagnostic results, the power converter may be controlled.

In another aspect of the present invention, the power converter includes a circuit for calculating a current change amount within a predetermined time period in a switching operation between conduction and interruption of a principal current flowing through a main circuit constituted by a power semiconductor, or a time needed for transition of a predetermined current change amount. A comparative determination is made whether or not the current change amount or the time needed for transition deviates from a reference value. The determination result is displayed or output. Alternatively, an operation condition of the power converter is controlled in accordance with the determination result.

The limit value of the maximum current in conduction of the switching element of the power converter may be set as the typical example of the operation condition control. As a specific example of the switching element, it is also possible to use various types of power semiconductor devices, for example, the insulation gate bipolar transistor, the power MOSFET, or the MOS gate control type as the power semiconductor.

Specifically, a condition for making the comparative determination with respect to deviation from a range of the reference value includes at least one or a combination of an output current value of the power converter, a direction of the output current flowing to the power semiconductor, a voltage across output terminals of the power semiconductor, a power-supply voltage, and a temperature inside the power converter.

The power converter as another specific example of the present invention is configured to use the reference value for comparative determination obtained by calculating one of properties including the current change amount in the power converter within a predetermined time period in the switching operation, which has been preliminarily measured, the time required for transition of the predetermined current change amount, the output current value of the power converter at the time point, the direction of the output current flowing to the power converter, the voltage across output terminals of the power semiconductor, the power-supply voltage, and the temperature inside the power converter.

Another specific example of the present invention is configured so that the circuit for calculating the current change amount or the time period needed for transition of the predetermined current change amount employs the circuit for outputting the voltage value proportional to the current change rate of the principal current per unit time or corresponding to the current change rate with a certain function. Based on the result of integration of the output for a predetermined time period in the switching operation, the current change amount is calculated.

The circuit magnetically coupled with the main circuit wiring may be employed as the circuit for outputting the voltage in accordance with the current change rate of the principal current per unit time. The circuit for outputting voltages of at least two points within the wiring for the main circuit, or the circuit for outputting the differential voltage of the output voltages may be employed as the circuit for outputting the voltage in accordance with the current change rate. The aforementioned structure which is simply configured is capable of measuring the instantaneous value of the current change rate. By integrating the current change rate as the instantaneous value, the current change amount within the predetermined time period may be calculated.

Another specific example of the present invention is configured to input the voltage value proportional to the current change rate, or corresponding to the current change rate with the function, and include an integration circuit for integrating the input value, which is constituted by resistor, capacitor, and operational amplifier, and a circuit for resetting by discharging a charge of the capacitor constituting the integration circuit for a predetermined time period. The reset state is released after an elapse of certain time period in the switching operation.

Another specific example of the present invention is configured to record the analog value of the voltage output in accordance with the current change rate by cyclic conversion into the digital value, and to calculate the current change amount through digital arithmetic operation using the value as the sum of the added digital values for a certain time period, and the cycle of the record.

Another specific example of the present invention is configured to include a communication unit which records the determination results, the current change amount or the time needed for transition of the predetermined current change amount, and externally outputs the recorded results from the power converter or the apparatus provided with the power converter.

Another specific example of the present invention includes a diagnostic section having a circuit for calculating the current change amount for a predetermined time period, a circuit for comparatively determining whether or not the current change amount deviates from the reference value range set in accordance with the current in conduction, and a circuit for displaying and outputting the determination result, or outputting the limit value of the maximum current value in conduction of the switching element of the power converter in accordance with the determination result. The diagnostic section can be connected to or disconnected from the main circuit, and is separated in the non-determination state so as to be movable.

Another specific example of the present invention includes the device which receives the information output from the communication unit for storage, the arithmetic circuit, the unit for diagnosis based on the received information, the unit for determining the operation conditions, and the unit for instructing output or display based on the information data.

Advantageous Effects of Invention

The present invention allows the simple structure to detect abnormality and deterioration in the power semiconductor, and the relevant power converter with high accuracy.

BRIEF DESCRIPTION OF DRAWINGS

FIG. 9 are plan views each showing an embodiment of the display contents with respect to the power converter according to the present invention.

FIG. 10 are plan views each as an example of the set screen for the operation control upon satisfaction with measurement conditions, determination conditions, and determination of the current change rate.

DESCRIPTION OF EMBODIMENTS

Figure 1:
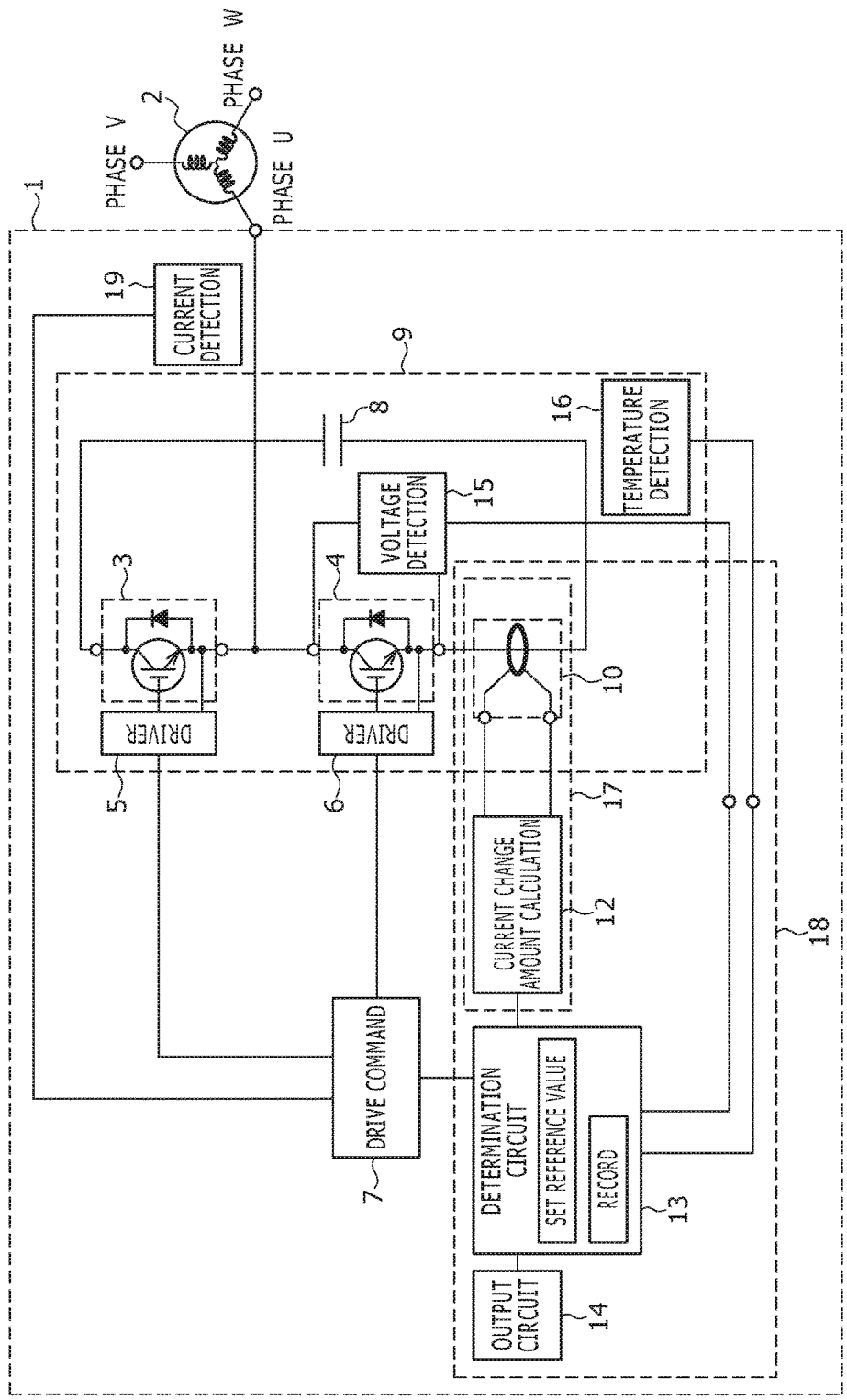
FIG. 1 is a block diagram showing an embodiment of the power converter according to the present invention.

Embodiments according to the present invention will be described in detail referring to the drawings. It is noted that the present invention is not intended to be interpreted in a restrictive way in reference only to the following description of the embodiment. It is clearly understood by any person skilled in the art that the present invention may be structurally changed or modified without departing from the concept and scope of the present invention.

In the following description, the same parts or those with the same functions will be designated with the same reference numerals, and repetitive explanations thereof, thus will be omitted.

The terms such as "first", "second", and "third" will be used for identifying the components of the structure with no intention to restrict the number or order of those components. The numbers for identifying the components will be used in the respective contexts. Therefore, the number used in the certain context does not necessarily indicate the same structure in another context. The component identified by the certain number is allowed to have the function of the component identified as another number.

The position, size, shape, and range of each structure shown in the drawing may fail to represent the actual position, size, shape, and range. Accordingly, the present invention is not necessarily limited to those disclosed in the drawings.

[First Embodiment]

FIG. 1 is a block diagram representing an embodiment of the present invention, which shows a power converter 1, and a three-phase electric motor 2 as the load driven by the power converter 1. FIG. 1 only shows a main circuit 9 at phase U of the power converter 1. However, each of phase V and phase W has the similar structure.

The power converter 1 is configured to allow gate driver circuits 5, 6 to control conduction and interruption of IGBTs 3, 4 as the power semiconductors, respectively based on the drive command generated by a drive command arithmetic circuit 7 so as to drive the electric motor 2. It is possible to employ various types of devices such as the insulation gate bipolar transistor, the power MOSFET, and the power semiconductor element of MOS gate control type for the power semiconductor with substantially no limitation.

Within the predetermined time period in switching operation between conduction and interruption of the principal current through the main circuit 9 of the power converter 1, the change amount of the principal current is calculated by a current change amount calculation circuit 12 in a current change amount calculation section 17 from the voltage proportional to the current change rate output from a voltage output circuit 10. A determination circuit 13 makes comparative determination whether or not the calculated current change amount deviates from the reference value, and allows an output circuit 14 to output the determination result.

The research conducted by the inventors reveals that the current change rate per unit time upon conduction and interruption of the current waveform depends on the power semiconductor temperature. It further reveals that the temperature dependency will change in accordance with the specific time point in the process of conduction or interruption. Accordingly, it is clarified that the power semiconductor temperature is detectable by evaluating the current change rate within the specified time period.

In the case of the insulation gate bipolar transistor as the power semiconductor of MOS gate control type, that is, IGBT, the absolute value of the current change rate upon current interruption will decrease because of increased current owing to temperature rise in the switching operation. The measurement verifies that setting of the appropriate drive conditions and the time range for determination allows detection of temperature based on fluctuation in the current change rate.

For example, fluctuation in the current change rate of 1 A/μs is expected to allow detection of the temperature difference of approximately 1° C. Using the aforementioned feature, the current change amount upon switching under the appropriate condition is evaluated so as to make the comparative determination with respect to the reference value determined from the current change rate in the normal state. In reference to the comparative determination results, it is possible to detect and diagnose abnormal temperature rise in the power semiconductor, and deterioration in the element and the system, leading to the temperature rise. The aforementioned numerical values are mere examples, and values concerning the relationship between fluctuation in the current change rate and the temperature difference depend on the element type. The determination may be made through comparison between the measured current change rate and the reference value, or between the temperature difference derived from converting the current change rate and the reference value.

The present invention will be described with respect to the method of calculating the current change rate from the current change amount within the predetermined time period. It is also possible to calculate the current change rate by using the current change amount within the time to be measured for the predetermined current value to change to another predetermined current value, and the measured time. The current change rate used for diagnosis is derived from the current change amount within the predetermined time period and the time width rather than the instantaneous value. This makes it possible to avoid the influence of noise.

The deterioration leading to the temperature rise is considered to be caused by increase in thermal resistance of the cooling system owing to thermal fatigue of the packaging structure, the leak current increase owing to insulation deterioration of the power semiconductor, variation of characteristics of the power semiconductor, and increase in generation loss of the power semiconductor owing to aging of the drive control circuit. In this embodiment, the temperature rise of the power semiconductor is indirectly measured to allow diagnosis on failure sign before the power semiconductor becomes out of order.

In the case where a plurality of elements are connected in parallel for increasing the power capacity of the power semiconductor, the temperature rise of the specific element may decrease the absolute value of the current change rate of total current of the elements connected in parallel. Accordingly, it is possible to detect the abnormality based on variation in the current change rate owing to temperature rise. It is considered that this embodiment is especially suitable for diagnosis on the power semiconductor of MOS gate control type which is frequently used in the state where a large number of elements are connected in parallel.

Since the current change rate fluctuates depending on the power-supply voltage, the voltage applied to the element, the output current value, and the direction thereof, it is preferable to provide a voltage detection unit 15 and a current detection unit 19 as shown in FIG. 1 for improving the determination accuracy relative to the reference value. Since the power semiconductor temperature is influenced by the ambient temperature, provision of a temperature detection unit 16 allows highly accurate determination by correcting the timing for making the determination, and the determination reference value of the current change rate.

As the voltage output circuit 10 for outputting the voltage proportional to the current change rate, Rogowski coil is available, which is magnetically coupled with the main circuit 9 for outputting the voltage proportional to the current change rate. The detection method using the magnetic coupling allows the simple structure to detect the principal current that is large enough to drive the motor for the train.

Figure 2:
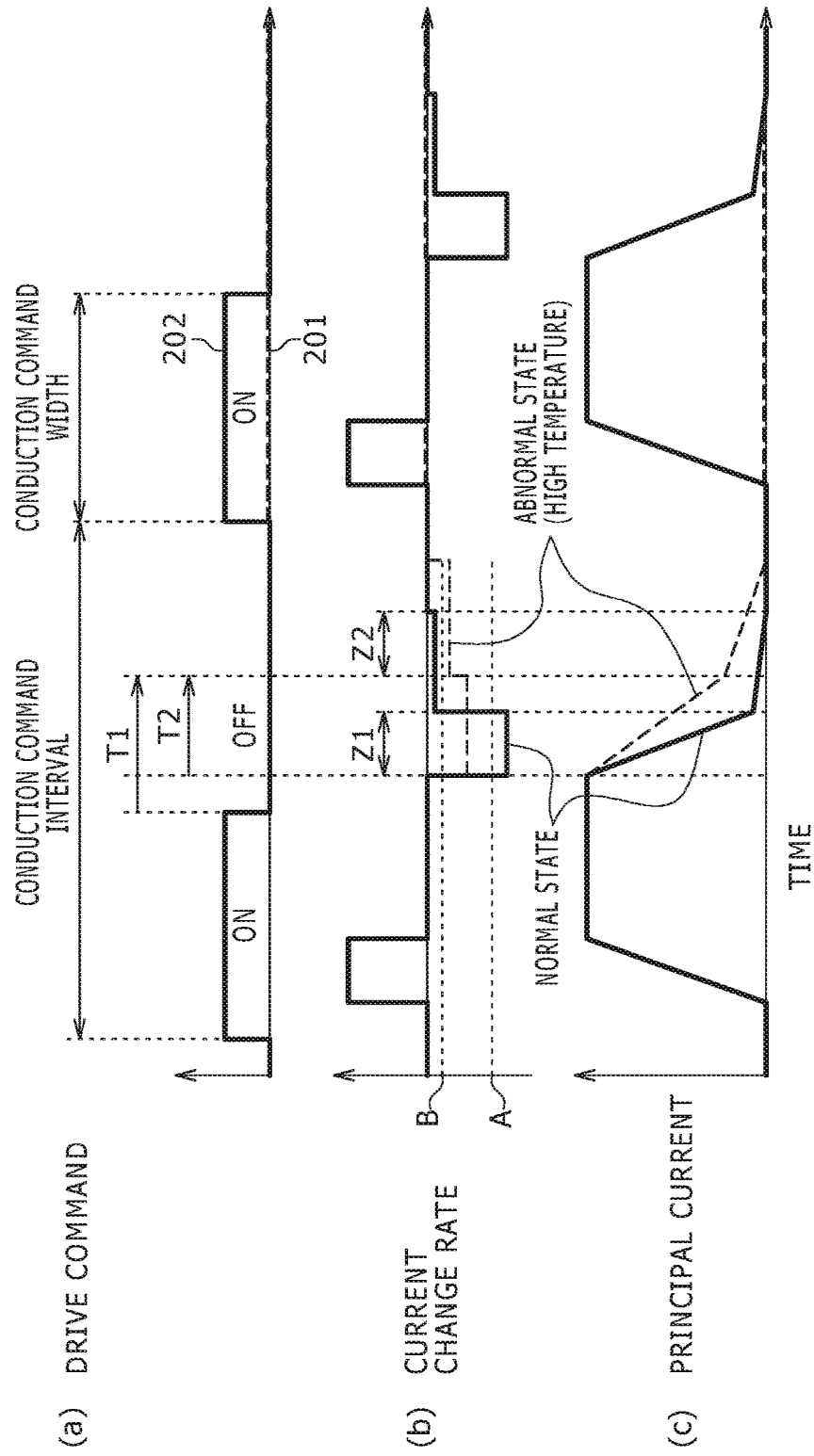
FIG. 2 are waveform charts each indicating a drive command and a signal waveform of the power converter according to an embodiment of the present invention.

FIG. 2 are timing charts representing operations conducted in the embodiment, indicating time on X-axis. FIG. 2(*a*) indicates the drive command, FIG. 2(*b*) indicates the current change rate, and FIG. 2(*c*) indicates each waveform of the output current (principal current), which are shown in accordance with current interruption operation as an example.

As FIG. 2(*a*) shows, upon switching of the drive command generated by the drive command arithmetic circuit 7 from ON state indicating the conduction state of the power semiconductor 3, 4 to OFF state indicating the interruption state, degradation of the principal current occurs to start interruption after an elapse of a certain delay time. At this timing, if abnormality in the power semiconductors 3, 4 causes increase in the temperature to be higher than the expected value, the principal current waveform will change as broken line of FIG. 2(*c*) shows. Then the absolute value of the current change rate is decreased as indicated by FIG. 2(*b*) (as the current change rate has a negative value in the interruption operation, the current change rate is numerically increased).

As the current change rate is variable in the switching operation, time periods are set like the time periods Z1, Z2 as shown in FIG. 2(*b*), and reference values A, B are set for the current change rates in the respective time periods so as to further improve the temperature detection accuracy. As solid and broken lines of FIG. 2(*c*) show, the current change amount per time is different in the time periods between Z1 and Z2. Detection of the aforementioned phenomenon allows diagnosis on the failure sign of the device.

Referring to FIG. 2(*a*), the time for starting the time period Z2 shown in FIG. 2(*b*) may be arbitrarily set in accordance with the time T1 as point of change from conduction to interruption of the drive command, or the time T2 from start of the current interruption. The end time of the time period Z2 may be set so as to ensure the time width required for measurement of the current change amount for calculation of the current change rate. Those time periods Z1, Z2 may be statistically determined by integrating pattern samples of abnormality in the device and change in the principal current, for example.

The aforementioned determination method allows calculation of the current at the start of switching and the current value as the product of the current change amount and the width of the time period. It is therefore possible to carry out the determination by converting the reference value into the current value by itself. In such a case, like the time period Z2 shown in FIG. 2(*b*), even in the time period after the current change rate has changed a plurality of times, the sum of the current change amounts in the entire time period is calculated from each current change amount in the respective time periods. It is therefore possible to calculate the current value from the sum and the current value before start of interruption for further determination.

The present invention allows appropriate control in accordance with deviation of the current change rate from the one in the normal state upon detection of abnormality. For example, it is possible to extract abnormality and deterioration in the device at an earlier stage with high accuracy for prevention of failure by displaying the deviation from the reference value, externally outputting the signal, controlling or stopping the output current value of the power converter, and the like. Referring to FIG. 2(*a*), a broken line 201 indicates the case where output of the control command after the abnormality detection is stopped for protecting the device upon determination that deviation of the current change rate from the value in the normal state in the time periods Z1 and Z2 is large. On the contrary, a solid line 202 indicates the normal case (there is no determination with respect to deviation from the reference value).

If deviation from the reference value is negligible, the embodiment may be configured to limit the maximum time width of the control command to ON state, and to drive for extending the time interval of the control command without stopping the output completely. This may reduce generation loss of the power semiconductor to suppress the temperature rise, operate the element while avoiding its deterioration, and operate the device while preventing unplanned stop so as to ensure the life extension of the device and resultant prolonged operation period.

It is also possible to store such data as the current change rate and diagnostic determination results so as to ensure adjustment of the control condition for execution of the operation period based on the number of abnormality occurrences, the time interval of generation periods, and fluctuation state of the current change rate. Calculation of the recommended timing for inspection and maintenance of the device from the aforementioned records, and reflection of the calculated data to the operation may prevent unplanned stop of the device and the operation period extension with higher accuracy. The determination and diagnosis with the current change rate similar to the one as described above may be performed upon switching operation for current conduction.

[Second Embodiment]

Figure 3:
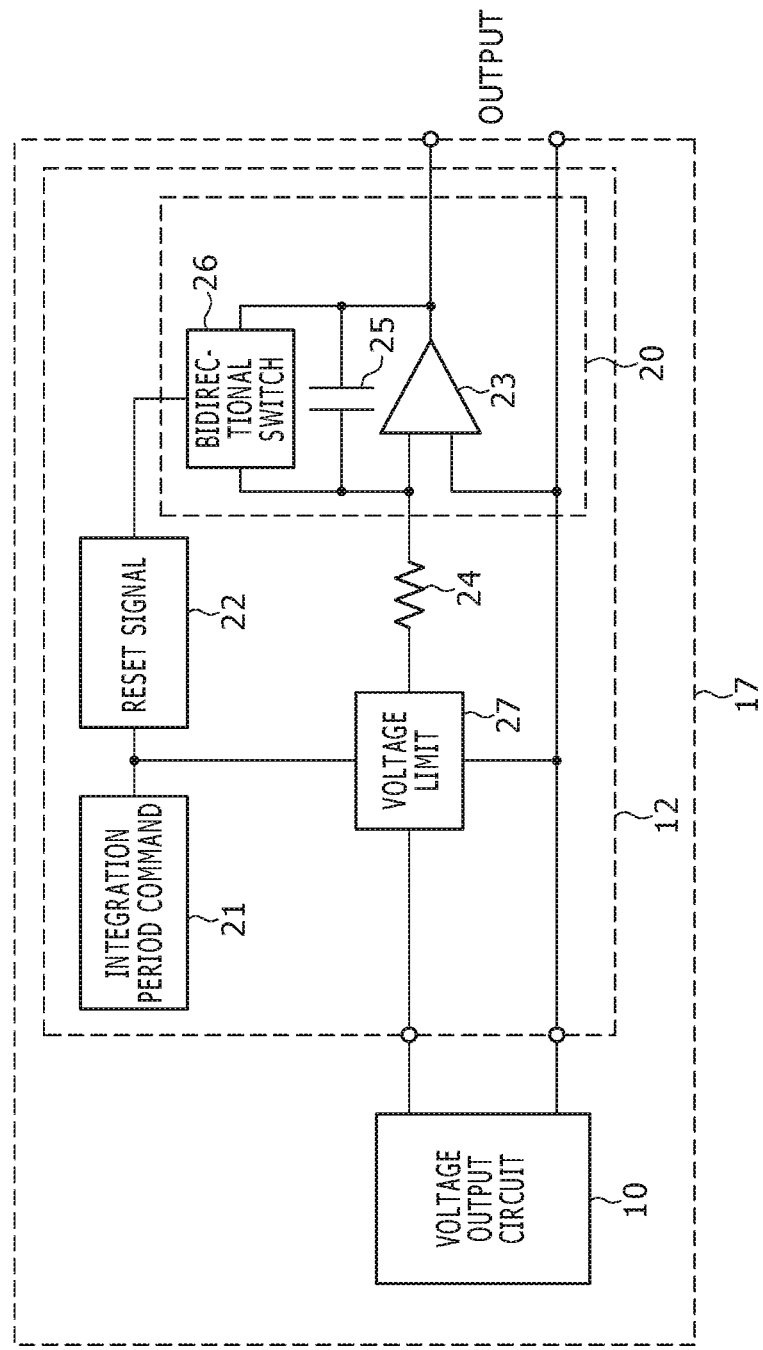
FIG. 3 is a block diagram of an embodiment of the circuit of the power converter for calculating a current change amount.

FIG. 3 shows a specific diagram of the current change amount calculation circuit 12 of the current change amount calculation section 17. In this embodiment, an output of the voltage output circuit 10 proportional to the current change rate is input to an integration circuit 20 via a voltage limit circuit 27 so as to output the current change amount obtained by integrating the current change rate within the specified time period. A determination circuit 13 compares the current change amount with the reference value for diagnosis.

The integration circuit 20 includes a resistor 24, an operational amplifier 23, a capacitor 25, and a bidirectional switch 26. The bidirectional switch 26 is driven by a drive signal generated by a reset signal generation section 22 upon reception of a command from an integration period command section 21. The switch is brought into ON state within the period where the output voltage of the integration circuit 20 is reset, and short-circuits the capacitor 25 for discharging at high speeds so as to reset the output to 0 V.

The voltage limit circuit 27 includes the function of dividing the voltage at the appropriate ratio, the function of setting the upper limit of the output voltage of the voltage output circuit, or combination of those functions so that the voltage input to the integration circuit 20 does not exceed the allowable voltage. The aforementioned functions serve to prevent destruction of the integration circuit 20, and to allow highly accurate detection of the current change amount with smaller absolute value. In the case where diagnosis is made within such time period as Z2 as shown in FIG. 2, it is preferable to set the output voltage of the voltage output circuit 10 to the high value for improving the diagnostic accuracy. In such a case, in the previous time period Z1, the output voltage of the voltage output circuit 10 is further higher, thus preventing the voltage from exceeding the input voltage range of the integration circuit 20, and regulating not to saturate the integration circuit.

Because it is difficult to conduct the diagnosis and determination while following up the short switching period and high-speed voltage output, and influence of noise caused by LC resonance upon switching is intended to be eliminated by integration, the output of the voltage output circuit 10 as the instantaneous current change rate is not directly used, but integrated for conversion into the current change amount. In the case of usage at the low switching speed with less noise, the integration circuit such as the low-pass filter with simply configured resistor and capacitor may be employed.

In the case of the diagnosis conducted in the region at the current change rate with small absolute value like the time period Z2 as shown in FIG. 2, the bidirectional switch 26 serves to discharge the charge of the capacitor 25 corresponding to the integration value in the previous time period Z1 for resetting the output of the integration circuit. Therefore, no saturation occurs in the integration circuit within the time period Z1 with large current change amount. Accordingly, the current change amount in the time period Z2 is only integrated and output, thus ensuring detection of the current change amount with high accuracy.

The diagnosis may be conducted both in the time periods Z1 and Z2 with high accuracy by providing the individually optimized current change amount calculation sections 17, respectively. The diagnostic time period may be set by imparting the switching function to the voltage limit circuit 27 so that the output of the voltage limit circuit 27 is short-circuited to 0 V in the time period other than the one for integration upon reception of the command from the integration period command section 21.

[Third Embodiment]

Figure 4:
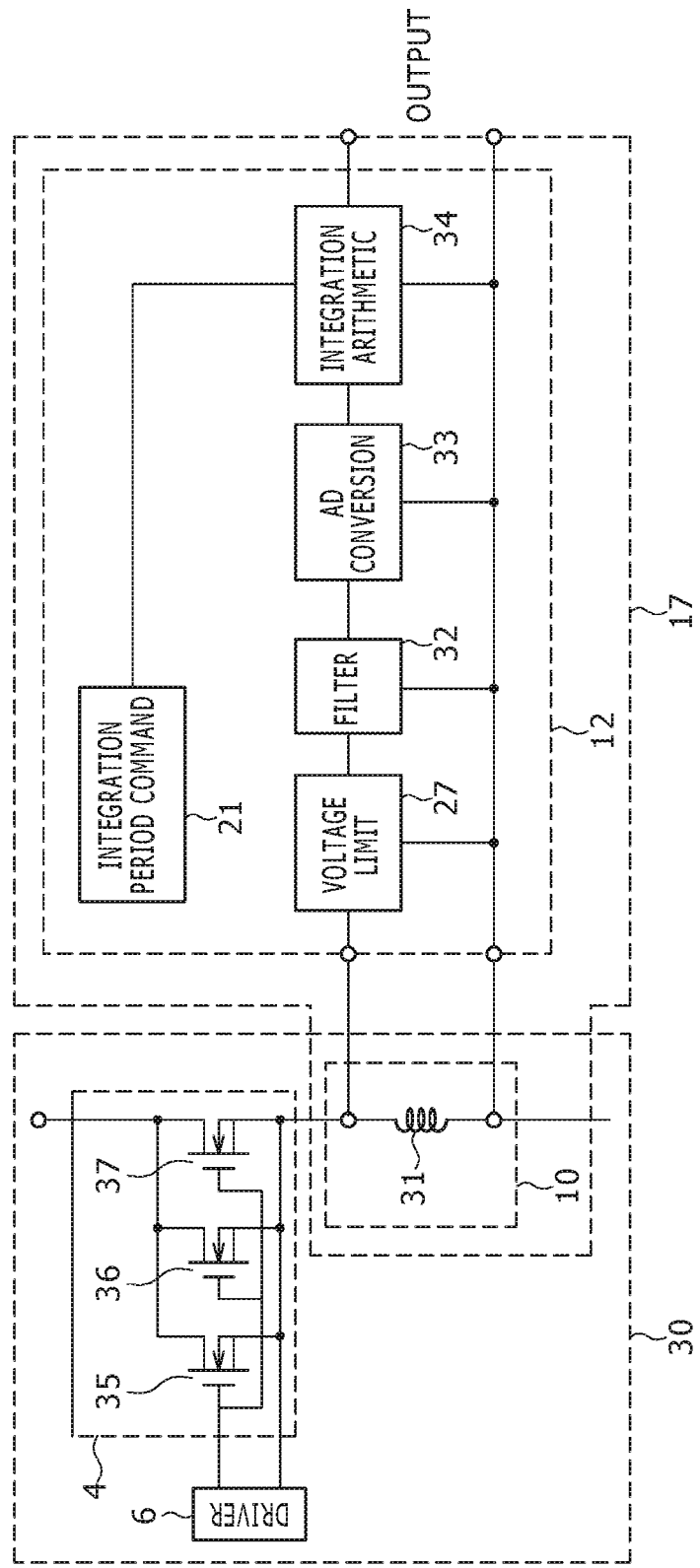
FIG. 4 is a block diagram of another embodiment of the circuit of the power converter for calculating the current change amount.

FIG. 4 is a view showing another embodiment of the present invention, specifically, another embodiment of the voltage output circuit 10 and the current change amount calculation circuit 12. FIG. 4 shows an exemplary structure of the main circuit as the embodiment of the power semiconductor 4, having a plurality of power MOS transistors 35, 36, 37 connected in parallel.

In this embodiment, the voltage output circuit 10 is configured to output a potential difference between two points where the main circuit wiring of main circuit 1 arm 30 exists. The output voltage is acquired as the product of a parasitic inductance 31 between the two points and the current change rate. Use of the parasitic inductance allows output of the voltage proportional to the target voltage change rate through the main circuit wiring without using an additional circuit. Accordingly, this embodiment is suitable for reducing cost and size of the device as well as simplifying its structure.

The aforementioned structure requires each arm to be provided with the voltage output circuit 10. However, use of the single voltage output circuit 10 allows diagnosis of the power semiconductors for a plurality of arms by disposing the two points for outputting the voltage around the capacitor 8 of the main circuit shown in FIG. 1 so that the arm that performs switching operation is identified based on the drive command arithmetic circuit 7 for determination.

The current change amount calculation circuit 12 receives an output from the voltage output circuit 10, which is further input to an AD conversion circuit 33 via the voltage limit circuit 27 and a filter 32 so that the analog value of the voltage is converted into the digital value at a sampling cycle. An integration arithmetic circuit 34 at the next stage calculates the current change amount in the corresponding period by digital operation based on the command of the integration period command section 21 using the digital value and the sampling cycle. The aforementioned structure for integration through the digital operation may prevent error in the current change amount owing to saturation of the integration circuit with the simple configuration. This makes it possible to calculate the current change amount with high accuracy.

[Fourth Embodiment]

Figure 5:
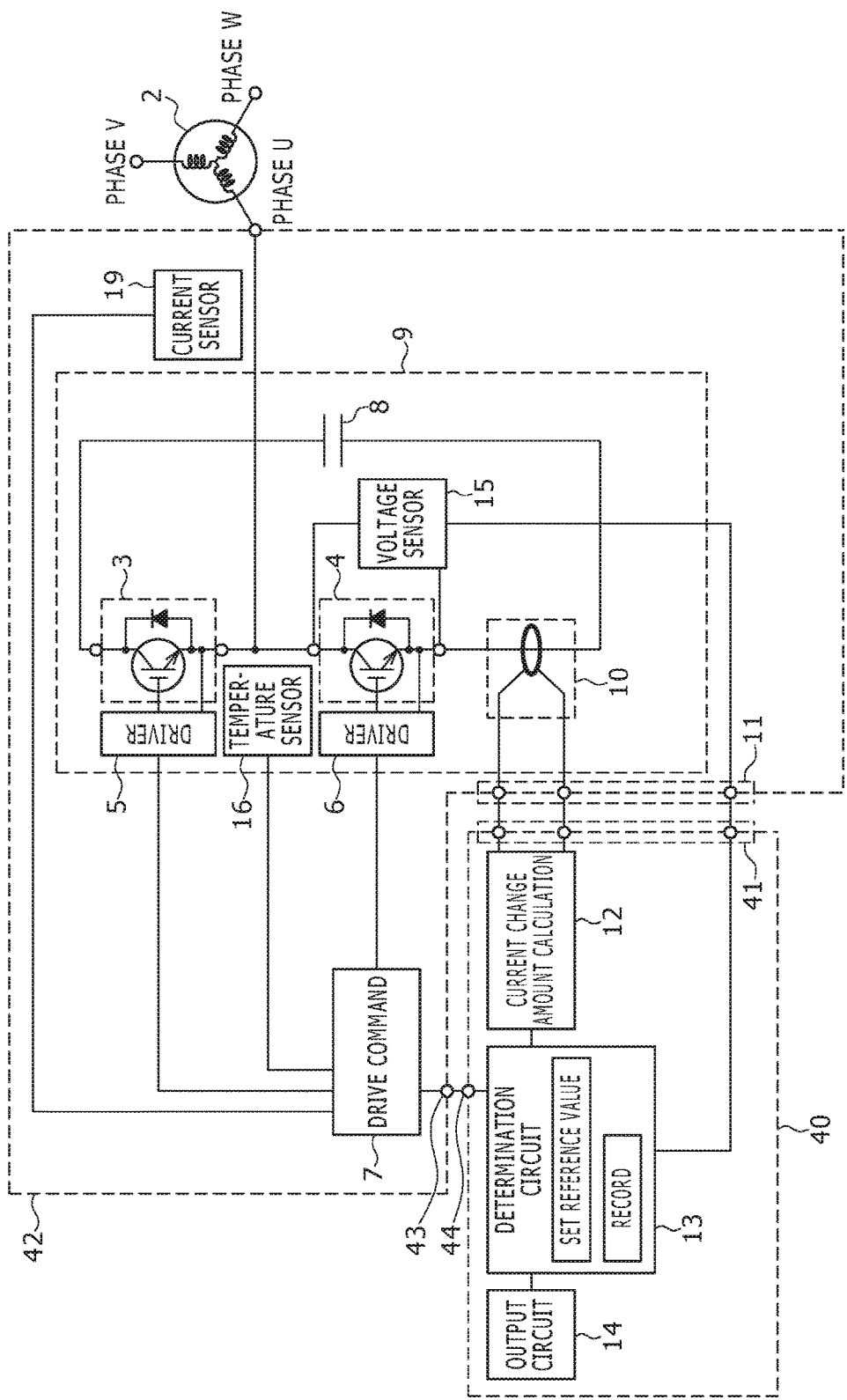
FIG. 5 is a block diagram of another embodiment of the power converter according to the present invention.

FIG. 5 is a view showing another embodiment of the present invention, especially configured to include an additional function of the present invention upon diagnosis of the power converter. Referring to the structure shown in FIG. 5 while focusing on the difference from the one shown in FIG. 1, a power converter 42 is provided with the voltage output circuit 10 and the voltage sensor 15 so that the signal is input to a separately disposed diagnostic device 40 via connectors 11, 41. In the system, signal values of the current detection unit 19 and the temperature unit 16, and the drive command signal of the drive command arithmetic circuit 7 are input to the diagnostic device 40 from the circuit 7 via connectors 43, 44. The current detection unit 19 and the temperature unit 16 are circuits employed by the power converter for drive command arithmetic operation.

The aforementioned structure which allows addition of the minimal circuit to the existing product ensures additional functions of diagnosing temperature abnormality, and estimating the maintenance interval. It is further possible to temporarily connect the diagnostic device 40 for operating the power converter upon the periodic inspection, which is kept disconnected in the normal operation so that the current change amount is evaluated. This makes it possible to confirm and diagnose adequacy of the power converter.

In the case where the embodiment is applied to the power converter for driving the railway vehicle, the periodic maintenance is conducted by externally connecting the above-structured diagnostic device 40 for diagnosis, resulting in compact power converter. Data stored in the storage device is periodically accumulated together with the vehicle identification number, and deterioration trend is compared with the one derived from the population of similar converters installed in another railway vehicles so as to ensure diagnosis with higher accuracy.

FIG. 5 only shows the power converter 42 connected to the phase U of the electric motor. Similar power conversion circuits 42 are connected to the phases V and W as well. It is possible to conduct diagnosis with the single diagnostic device 40 by selecting connection of the connector 11 or 43 to the corresponding power conversion circuit 42.

[Fifth Embodiment]

Figure 6:
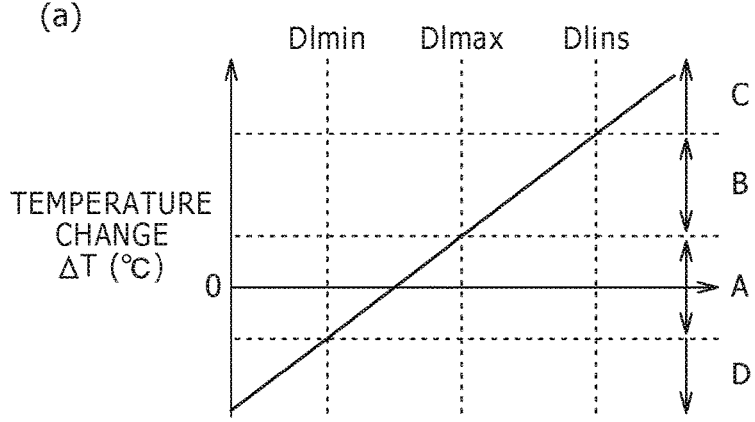
FIG. 6 are explanatory views showing an embodiment of a determination method for the power converter according to the present invention.

FIG. 6 show an embodiment of determination made by the power converter according to the present invention. In the embodiment, the temperature change amount AT from the power semiconductor temperature in the initial normal state is calculated from the current change amount ΔI within the predetermined time period. In accordance with any one of the temperature change amount regions A to D, which includes the calculated value, the operation conditions may be set or warning is displayed. FIG. 6(a) shows the relationship between the current change amount and the power semiconductor temperature, which is assumed to have linearity.

Referring to FIG. 6(a), in the region A, the temperature is near the one of the power semiconductor (ΔT=0) in the normal state. There is no or negligible deterioration in the power semiconductor, allowing standard operation. The region A corresponds to the range from DImin to DImax of the current change amount in the drawing.

In the region B which allows operation although slight deterioration is observed, the life extending operation may be conducted by limiting the maximum current value of the power semiconductor so as not to exert especially high load for the purpose of suppressing the development of deterioration. The region B corresponds to the range from DImax to DIins shown in the drawing. If a plurality of power converters are operated in the railway vehicle, for example, the output of another power converter normally operated in the region A is increased within the allowable range. This makes it possible to maintain the original performance without reducing the output of the overall system.

In the region C which allows operation but will further develop the deterioration, the system performance cannot be maintained, which is therefore expected to demand maintenance and inspection. In this region C corresponding to the current change amount equal to or larger than DIins, the device may be operated under the life extending condition while having the operation conditions mitigated. Since the overall system performance is limited, the warning which instructs to conduct the maintenance and inspection, and the output restriction status will be displayed.

In the region D in which the power semiconductor temperature is lowered compared with the one in the original normal state. The region corresponds to the current change amount equal to or smaller than DImin. In this case, deterioration in the power semiconductor by itself is not observed. However, there are possibilities of abnormality which occurs in the measurement device and the diagnostic circuit for diagnosis. In this region, the warning which instructs to conduct the maintenance and inspection will be displayed.

The determination as described above may be defined in accordance with the field to which the system is applied, and circumstances, and stored in the determination circuit 13 as data shown in FIG. 6(b).

[Sixth Embodiment]

Figure 7:
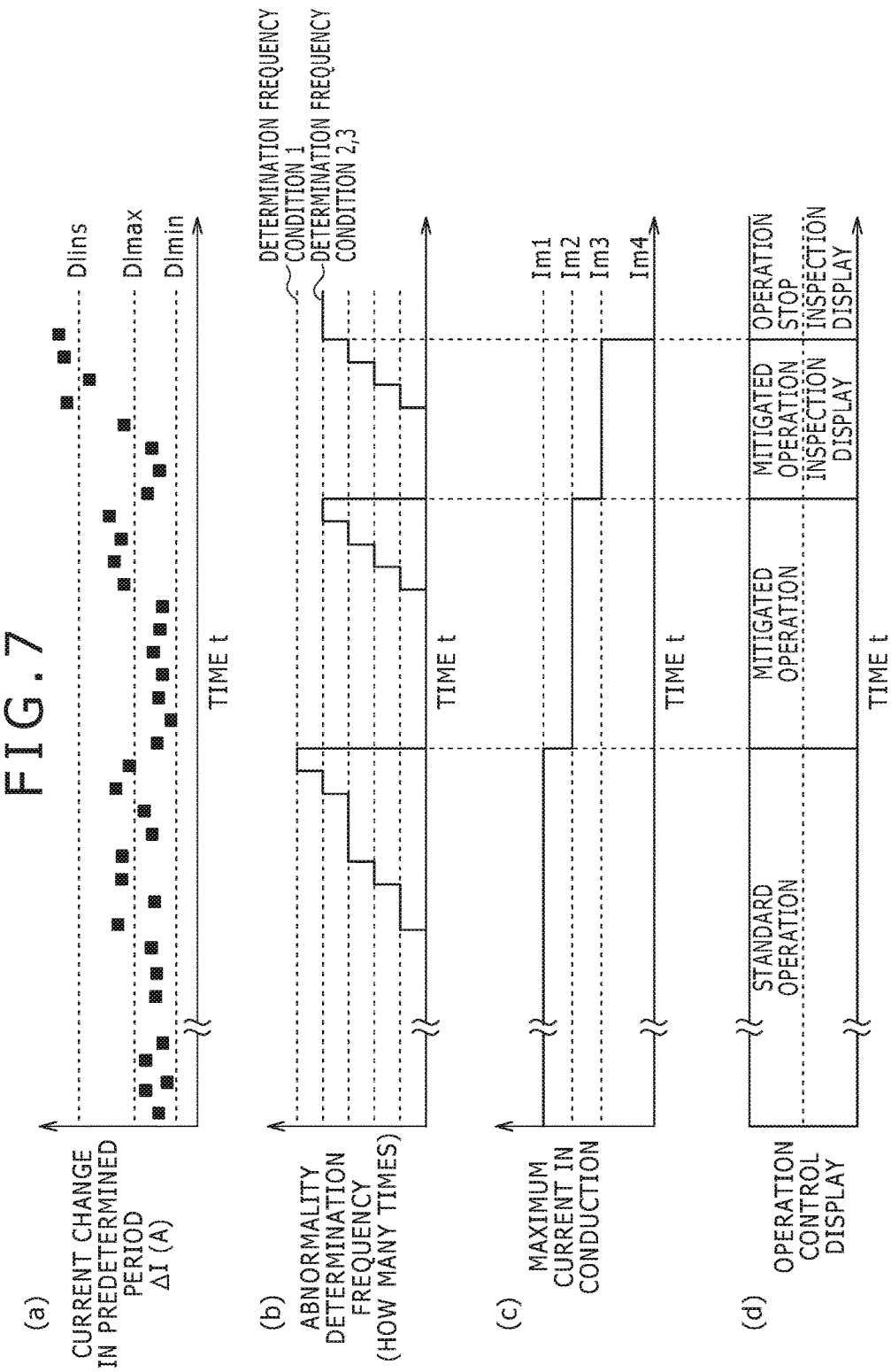
FIG. 7 are charts each representing an embodiment of the operation command and display contents for the power converter according to the present invention.

FIG. 7 are graphs representing an embodiment with respect to control of the power converter and the display contents in detail, indicating time on the X-axis. The relationship between the current change amount ΔI and the temperature change amount ΔT will be described using the one shown in FIG. 6(a) as an example. The embodiment shown in FIG. 7 explains determination in consideration of not only the current change amount value but also the number of standard operations while having the value deviating from the region A which allows the standard operation as shown in FIG. 6(a).

Referring to FIG. 7(a), the current change amount is measured under a specific condition in operation, and it is determined with respect to the region in which the measured value exists. The plotting in FIG. 7(a) represents the determination results.

The number corresponding to the region in excess of the temperature range in the region A as shown in FIG. 6(a) is stored as indicated by FIG. 7(b). Referring to FIGS. 7(a) and (b), there are five or more times in excess of the temperature range of the standard operation in the region A within the first standard operation period (see FIG. 7(c)). The number of abnormality determinations counts 5 as shown in FIG. 7(b).

The determination number condition is set for combination of the operation condition and the number of abnormality determinations. For example, the condition that "the number of exceeding the standard operation temperature range in the region A in the standard operation is more than 5" is set as "the determination number condition #1". The condition that "the number of exceeding the standard operation temperature range in the region A in the mitigated operation is more than 4" is set as "the determination number condition #2". The condition that "the number of exceeding the standard operation temperature range in the region A in display of the mitigated operation inspection" is set as "the determination number condition #3".

In excess of the determination number condition corresponding to the determined frequency and region, the operation condition will be changed. Referring to FIG. 7(c) and FIG. 7(d), if the "determination number condition #1" is satisfied, the maximum current is decreased to Im2. If the "determination number condition #2" is satisfied, the maximum current is decreased to Im3. If the determination number condition #3" is satisfied, the maximum current is decreased to Im4.

The mitigated operation may limit the maximum current in conduction of the power semiconductor, and display warning to conduct the inspection while suppressing further deterioration. In other words, FIG. 7(c) indicates that the load to the device is reduced as the mitigated operation condition by sequentially decreasing the maximum current value during conduction from Im1 to Im4.

In the case where it is determined as difficulty in continuous operation because of large amount of change in the current change amount from the initial value, the operation is stopped for avoiding destruction so as to display the command to conduct the inspection. For example, in the case where the current change within the predetermined period exceeds DIins, indicated by the right end of FIG. 7(a), the device may be configured to immediately stop the operation.

As described above, this embodiment is configured to record the comparative determination results under predetermined conditions, and to display and output the results if the frequency and the time interval satisfy the certain condition, or control the power conversion in accordance with such results. The aforementioned examples have explained the case where the limit value of the maximum current upon conduction of the switching element of the power converter is set, and the case where control is conducted so that the power semiconductor is interrupted. However, examples of control are not limited to those described above. The power semiconductor may be interrupted by controlling the drive command of the power semiconductor, or the drive voltage to be applied to the power semiconductor for a fixed period.

Mitigation of the operation conditions and the inspection timing may be displayed to ensure prevention of unplanned stop or destruction of the system which employs the power converter with high accuracy. Furthermore, it is possible to provide the power converter which allows life extension of the system at lower costs.

[Seventh Embodiment]

Figure 8:
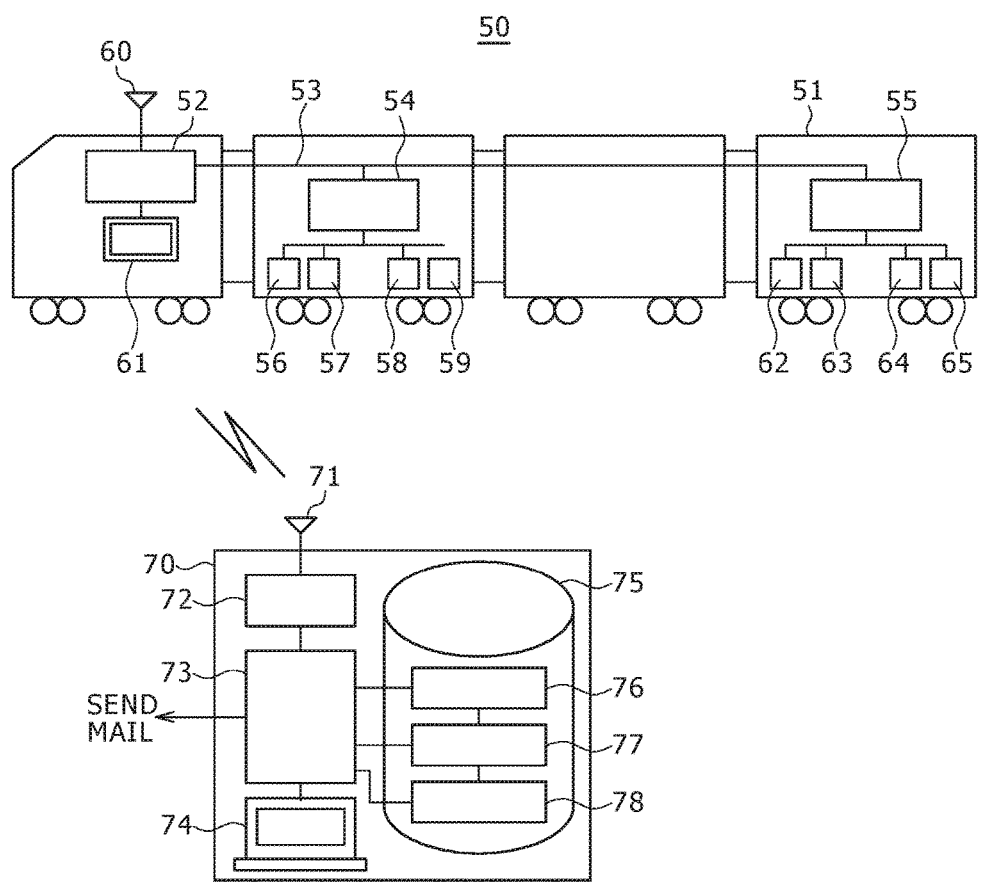
FIG. 8 is a block diagram representing an embodiment in which the power converter according to the present invention is mounted on the railway vehicle.

FIG. 8 shows an embodiment having the power converter according to the present invention installed in the railway vehicle. An on-vehicle control device 52 for a railway vehicle 50 is configured to use an on-vehicle communication unit 53 for controlling power converters 54, 55. Electric motors 56, 57, 58, 59, 62, 63, 64, 65 are driven by outputs of those power converters.

Each structure of the power converters 54, 55 may be the same as that of the power converter 1 as shown in FIG. 1.

Referring to FIG. 8, the on-vehicle control device 52 includes an on-vehicle antenna 60 for communication with a ground diagnostic device 70 located outside the vehicle. An on-vehicle display device 61 is connected to the on-vehicle control device 52 to display warning and the operation status. The ground diagnostic device 70 includes a ground antenna 71, a ground communication unit 72, an arithmetic device 73, a display terminal 74, a storage device 75, a diagnostic unit 76, an operation condition determination unit 77, and an output instruction unit 78.

The embodiment is configured so that the on-vehicle antenna 61 periodically transmits the current change amount within the predetermined period as shown in FIG. 7, and the information on the temperature change amount range corresponding to the current change amount to the ground diagnostic device 70. Specifically, for example, the output of the determination circuit 13 as shown in FIG. 1 is transmitted from the on-vehicle antenna 61. Alternatively, the on-vehicle antenna 61 may be configured to transmit outputs from the voltage detection circuit 15, the temperature detection circuit 16, the current change amount calculation circuit 17, and the current detection circuit 19 as shown in FIG. 1. In the aforementioned case, the ground diagnostic device 70 is assumed to have the function of the determination circuit 13. The on-vehicle antenna 61 may also be configured to transmit output signals of the terminals 11 and 43 as shown in FIG. 5. In the aforementioned case, the ground diagnostic device 70 is assumed to have functions of the current change calculation circuit 12 and the determination circuit 13. As described above, the diagnostic function may be separately imparted to the on-vehicle side and the ground side. The communication between the on-vehicle side and the ground side may be conducted either wiredly or wirelessly.

The information from the on-vehicle antenna 61 is stored in the storage device 75 via the arithmetic device 73. Based on the information, the diagnostic unit 76 quantifies deterioration of the power converters 54, 55. The operation condition determination unit 77 determines the operation condition for the respective power converters and the railway vehicle as a whole from the respective conditions of the power converters 54, 55. For example, the operation control method may be designed to operate the power converter 54 for life extension while supplementing deficient output by increasing the output of the power converter 55.

The results are transmitted to display terminals on the ground, or the relevant department through mails via the output instruction unit 78, and further to the railway vehicle via the communication unit. Based on the transmitted information, the on-vehicle control device 52 adjusts the operation conditions so as to be reflected to the operation state.

The timing and frequency of the communication are set so that the ground diagnostic device 70 is disposed on the train base for communication upon periodical maintenance and inspection, and the diagnosis is conducted as well as adjustment of the operation condition and maintenance work as needed. It is also possible to conduct real-time monitoring diagnosis.

The storage device, the diagnostic unit, and the determination unit of the ground diagnostic device 70 are not disposed separately in the respective train bases, but disposed in the integrated data center to ensure collection of the information with respect to the power converters of similar model. This may increase the number of diagnostic objects, resulting in highly accurate determination reference value in statistical aspect in addition to the aforementioned aspect. The ground diagnostic device 70 may be constituted by the single unit of computer. Alternatively, an arbitrary part of the device may be constituted by another computer connected via network for sharing the operation.

FIG. 9 show an embodiment of display content of the power converter according to the present invention, corresponding to the display contents output from the on-vehicle display device 61 and the display terminal 74 on the ground as the example shown in FIG. 8. The display terminal includes an input device such as the keyboard, which allows various types of setting for the diagnosis.

FIG. 9(a) shows an example of the display content, specifically, the operation status and maintenance-inspection status based on the determination results. Selection of an "inspection object" button allows display of the detailed inspection object as a layer sub-menu as shown in FIG. 9(b).

Referring to FIG. 9(b), the inspection object is selected from the converters 54 and 55 for designation. The device code of the selected converter is automatically displayed. Upon selection of the specific device from the inspection object, the inspection content is displayed on the layer menu as shown in FIG. 9(c) for providing information on the procedure of the inspection. Concerning the inspection content, the power semiconductor of the device is specified, for example. In the case of the inspection result based on the inspection procedure, the set value may be input from the "change set value" as shown in FIG. 9(d). FIG. 10 show an example of setting the operation control in the case where the measurement condition, determination condition, and determination of the current change rate are satisfied in the embodiment of the present invention. The drawings are displayed similarly to those shown in FIG. 9. The display timing may be arbitrarily set upon inspection as described above.

FIG. 10(a) shows an example of the screen for displaying the set measurement condition upon current interruption, which allows setting for each device to be diagnosed. Referring to FIG. 10(a), the time periods Z1, Z2 as shown in FIG. 2 are set. It is also possible to display the reference image as shown in FIG. 2, simultaneously. Limiting the measurement time allows compression of data to be stored, and simplified determination by designating the timing significant for diagnosis.

FIG. 10(b) shows an example of the screen for displaying the determination condition in the time period Z1 upon current interruption, and setting of the operation control upon satisfaction of the determination. For example, the temperature change amount is calculated from the current change amounts in the time periods Z1 and Z2 as shown in FIG. 2 so as to determine the control content with respect to the temperature change amount. For example, ranges of the temperature change regions A, B, C and D as shown in FIG. 6 are set. Referring to FIG. 6, the temperature change amount is defined as ΔT. Assuming that the reference temperature is set as the room temperature, the actual temperature may be entered as it is. It is also possible to set the operation control content (mode) in the corresponding region on the same or the different screen. At this time, the views like FIG. 6 and FIG. 7 may be displayed for reference.

The data for setting the input conditions as shown in FIG. 9 and FIG. 10 may be stored in the determination circuit 13 and the storage device of the ground diagnostic device 70.

The control method according to the embodiment has been described, which ensures diagnosis on abnormality and deterioration of the power semiconductor based on the current change amount, and protection or prolonged operation while mitigating development of deterioration. It is to be easily understood that the similar method may be used for diagnosis on or protection from deterioration or abnormality in the respective sections of the power converter outside the power semiconductor, which will cause similar temperature abnormality. Deterioration in performance of the cooling device, and signal of the communication circuit, and waveform abnormality for driving the gate driver may be regarded as examples of the abnormality.

The present invention is not limited to the embodiments as described above, and includes various modifications. For example, it is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

The embodiments described in detail provides the power converter configured to detect the current change rate of the power semiconductor, and compare the detected rate with the reference value for determination to ensure highly accurate detection of abnormality and deterioration in the power semiconductor and the relevant power converter, highly accurate prevention of malfunction such as failure, and the prolonged service life.

The present invention is applicable to the use in the field of maintenance and inspection of various types of power semiconductors.

LIST OF REFERENCE SIGNS

1, 42: power converter
2: electric motor
3, 4: IGBT
5, 6: gate driver circuit
7: drive control circuit
8: capacitor 8 of main circuit
9: main circuit
10: voltage output circuit
11, 41, 43: connector
12: current change amount calculation circuit
13: determination circuit
14: output circuit
15: voltage detection unit
16: temperature detection unit
17: current change amount calculation section
18: diagnosis section
19: current detection unit
20: integration circuit
21: integration period command section
22: reset signal generation section
23: operational amplifier
24: resistor
25: capacitor
26: bidirectional switch
27: voltage limit circuit
30: main circuit 1 arm
31: main circuit parasitic inductance
32: filter circuit
33: AD conversion circuit
34: integration arithmetic circuit
35, 36, 37: MOS
40: diagnostic device
50: railway vehicle
51: vehicle
52: on-vehicle control device
53: on-vehicle communication unit
54, 55: power converter
56, 57, 58, 59, 62, 63, 64, 65: electric motor
60: on-vehicle antenna
61: on-vehicle display device
70: ground diagnostic device
71: ground antenna
72: transmission/reception section
73: arithmetic device
74: display terminal
75: storage device
76: diagnostic unit
77: operation condition determination unit
78: output instruction unit

The invention claimed is:

1. A diagnostic system for a power converter which includes a semiconductor device, and performs a switching operation between conduction and interruption of a principal current flowing through a main circuit, the diagnostic system comprising:
   a current change amount calculation circuit for obtaining numeric data which reflects a current change amount of the principal current per unit time;

a determination circuit for determining a determination result representing a state of the power converter by comparing the numeric data with a reference value; and a voltage output circuit configured to output a voltage value based on the determination result of the determination circuit, wherein the current change amount calculation circuit further comprises an integration circuit including a resistor, a capacitor, and an operational amplifier, which integrates an input voltage value proportional to the current change rate or corresponding to the current change rate in accordance with a function, and a circuit which discharges a charge of the capacitor of the integration circuit for a specified time period for resetting, and wherein the reset is released within a predetermined time period in the switching operation.

2. The diagnostic system for a power converter according to claim 1, wherein setting of at least one of a time period taken for obtaining the numeric data and the reference value is allowed.

3. The diagnostic system for a power converter according to claim 1, wherein the current change amount calculation circuit is connected with the power converter by conducting at least one of integral formation, wired connection, wireless connection, and connection separable with a terminal;

the determination circuit is connected with the current change amount calculation circuit by conducting at least one of integral formation, wired connection, wireless connection, and connection separable with the terminal; and the output circuit is connected with the determination circuit by conducting at least one of integral formation, wired connection, wireless connection, and connection separable with the terminal.

4. The diagnostic system for a power converter according to claim 2, wherein, during a time period for obtaining the numeric data, the current change amount calculation circuit integrates the current change amount per unit time to obtain the numeric data.

5. A power converter comprising:

a current change amount calculation section which includes a current change amount calculation circuit configured to calculate a current change amount within a predetermined time period in a switching operation between conduction and interruption of a principal current flowing through a main circuit constituted by a power semiconductor, or a time needed for transition of a predetermined current change amount, wherein the current chance amount calculation section is configured to make a comparative determination of whether or not the current change amount or the time needed for transition deviates from a reference value, wherein at least one of operations to display a determination result, output the determination result, and control an operation condition of a switching element as the power semiconductor in accordance with the determination result is conducted, wherein the current change amount calculation section includes a voltage output circuit for outputting a voltage, value proportional to a current change, rate of the principal current per unit time, or corresponding to the current change rate with a function, wherein the output is integrated for a predetermined time period in the switching operation, and the current change amount is calculated using a result of the integration, wherein the current change amount calculation section further comprises an integration circuit including a resistor, a capacitor, and an operational amplifier, which integrates and input voltage value proportional to the current change rate or corresponding to the current change rate in accordance with a function, and a circuit which discharges a charge of the capacitor of the integration circuit for a specified time period for resetting, and wherein the reset is released within a predetermined time period in the switching operation.

6. The power converter according to claim 5, wherein a condition for making the comparative determination with respect to deviation from a range of the reference value includes at least one or a combination of an output current value of the power converter, a direction of the output current flowing to the power semiconductor, a voltage across output terminals of the power semiconductor, a power-supply voltage, and a temperature inside the power converter.

7. The power converter according to claim 5, wherein an operation condition of the switching element is controlled by setting a limit value of a maximum current value in conduction of the switching element, or changing a drive voltage applied to the switching element for a predetermined time period so that the switching element is interrupted.

8. The power converter according to claim 5, wherein the comparative determination result is recorded, and if at least one of the number of results that satisfy a predetermined condition and a time interval meets a certain condition, at least one of operations to display the result, output the result, and control an operation condition of the switching element in accordance with the determination result is conducted.

9. The power converter according to claim 5, wherein at least one of operations to decrease a time width of a conduction command of the switching element, and increase a time interval of the conduction command is conducted in accordance with the comparative determination result.

10. The power converter according to claim 5, wherein the voltage output circuit for outputting the voltage in accordance with the current change rate of the principal current per unit time is magnetically coupled with a wiring of the main circuit.

11. The power converter according to claim 5, wherein the voltage output circuit for outputting the voltage in accordance with the current change rate of the principal current per unit time is configured to output voltages of at least two points in a wiring of the main circuit, and to output a differential voltage of the output voltages.

12. The power converter according to claim 5, wherein an analog value of the voltage output in accordance with the current change rate is cyclically converted into a digital value for recording; and a value derived from adding the digital values for a specified time period, and a cycle of the record are used for calculating the current change amount through a digital arithmetic operation.

13. A diagnostic method of a power converter which includes a semiconductor switching element for a switching operation between conduction and interruption of a principal current, the method comprising:
- a first step of detecting a current change amount of the principal current per unit time;
- a second step of integrating the current change amount through a digital circuit or an analog circuit for a predetermined time period; and
- a third step of determining a state of the power converter based on a result of the integration,
- wherein the second step of integrating further comprises integrating an input voltage, value proportional to a current change, rate or corresponding to the current change rate in accordance with a function, using an integration circuit which includes a resistor, a capacitor, and an operational amplifier, and a circuit which discharges a charge of the capacitor of the integration circuit for a specified time period for resetting, and
- wherein the reset is released within a predetermined time period in the switching operation.

* * * * *